United States Patent Office 3,078,314
Patented Feb. 19, 1963

3,078,314
POLYUNSATURATED PHENYL ETHERS
AND THEIR PREPARATION
Philip Monnikendam, New York, N.Y., and Charles R. Dawson, Leonia, N.J., assignors to Minnesota Mining and Manufacturing Company, St. Paul, Minn., a corporation of Delaware
No Drawing. Filed Dec. 15, 1959, Ser. No. 859,572
1 Claim. (Cl. 260—612)

This invention relates to novel compounds and to methods for preparing them. In one of its more specific aspects this invention is directed to novel compounds of the following Formula II:

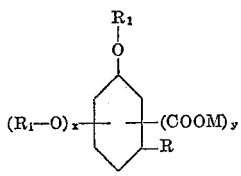

wherein $x$ is selected from the group consisting of zero and one; R is a straight chain aliphatic hydrocarbon radical of 15 carbon atoms, having at least two, and generally two or three ethylenic linkages therein, with all of said ethylenic linkages being conjugated; M is selected from the group consisting of $R_1$ and the metals of groups I and II of the periodic table; and $y$ is either zero or one; and each $R_1$ is selected from the group consisting of hydrogen, alkyl, alkylene, aryl, arylalkyl, alkylaryl and alkanol radicals of 1–22 carbon atoms, examples of which are methyl, ethyl, butyl, propyl, etc. to docosanyl, allyl, crotyl, acrylyl, methacrylyl, oleyl, etc., phenyl, naphthyl, anthranyl, etc., phenylmethyl, phenylethyl, phenyloctyl, diphenyl methyl, triphenyl methyl, etc., tolyl, xylyl, trimethyl phenyl, tetramethyl phenyl, etc., hydroxy ethyl, hydroxy propyl, hydroxy octyl, hydroxy stearyl, etc. radicals. All of said radicals other than ethyl are equivalent to ethyl insofar as the present invention is concerned. The sum of $x$ and $y$ in the above formula is equal to zero or one.

I have found that because all of the double bonds in R of said compounds of Formula II are in conjugated relationship, such compounds are extremely reactive with oxygen, maleic anhydride, etc. and are extremely self-reactive in the presence of strong acids or peroxides or upon the mere application of heat to thereby produce homopolymers thereof. Such compounds of Formula II may be used as components of paints and varnishes, or they may be reacted with maleic anhydride, acrolein, acrylic acid, etc. to form carbonyl or carboxyl containing Diels-Alder type adducts and such adducts may be further reacted with aldehyde-reactive phenols and polyhydric aliphatic alcohols, respectively, to produce phenolic and alkyd resins respectively finding application as resinous coating materials in the fields of electrical insulation, metal drum coatings, etc.

Another type of application utilizing the homopolymerizability of these compounds of Formula II is as solventless internal curing varnishes. Electrical coils, etc. may be impregnated with compounds of Formula II which have relatively low viscosity and upon heating, the liquid compound of Formula II within the interstices of the coils becomes homopolymerized to thereby bond the wires of the coil into a solid mass having good moisture resistance and wherein the individual turns are separated from each other by a coating of good electrical resistance.

These compounds may be reacted with maleic anhydride, acrylic acid, etc. to form carboxylic acids which may be reacted with polyhydric alcohols to produce alkyd resins finding application as resinous coating materials in the fields of electrical insulation, metal drum coatings, etc.

Further, these compounds with completely conjugated side chains can be copolymerized with butadiene, styrene, acrylonitrile, etc. to foam rubbery compounds. In the case of our completely conjugated compounds having free phenolic groups, these rubbery co-polymers may be further reacted with phenol-reactive aldehydes to form infusible vulcanizates. Such reactions are particularly desirable in forming the bonds or acting as binders for asbestos fibres in frictional elements such as brake-linings, clutch facings, etc. The asbestos fibres are mixed with the phenolic co-polymers, either in solvent solution in a dough-mixer or in rubbery form by milling, together with hexa-methylene tetramine or paraformaldehyde as the curing agent for the copolymer. Upon baking the resultant mass at temperatures of 250°–350° F. the copolymers are cured to resilient, infusible masses producing frictional elements with high coefficient of friction and good wearing properties.

For example, any of said compounds of Formula II is homopolymerized with or without the use of heat depending upon the particular compound used, until the molecular weight reaches approximately 1,000 to 2,000 whereupon it is dissolved in mineral spirits. The ratio by weight of said homopolymer to said mineral spirits is approximately 1–1. To said solution is added metallic driers, such as lead, manganese and cobalt naphthenates. The amount of such driers added is such that the amount of the metallic element thereof is about 0.5–1% of the weight of said homopolymer. The resultant varnish may be applied as a thin film which may be either air dried or bake-dried at 250°–300° F. The resulting film has good ageing properties which makes it especially useful for exterior coating and also has excellent electrical properties, thus making it also particularly useful for electrical insulating purposes.

Prior to this invention, it was known that certain naturally occurring materials such as cashew nut shell liquid, urushiol, etc. could be treated in order to produce materials which we employ as starting materials in the practice of this invention, and such materials are compounds or mixtures of compounds of the following Formula I:

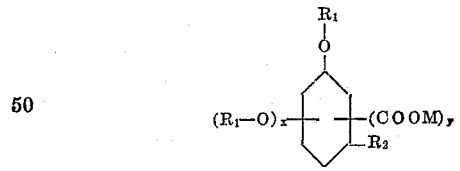

wherein M, $y$, $x$ and $R_1$ are of the same definitions as those heretofore given for said respective symbols and $R_2$ is the same as R as heretofore defined except that at least two, that is two or more ethylenic linkages therein are unconjugated, that is that at least one ethylenic linkage therein is not in conjugated relationship with respect to at least one other ethylenic linkage therein.

The compounds of Formula I as well as mixtures of such compounds may be produced in the manner known to the art and in fact some of these specific compounds of Formula I are specifically disclosed in various patents and other publications. Reference is hereby made to U.S. patents to Solomon Caplan 2,181,119 and 2,240,034, McCleary 2,384,323, and also to an article by Symes and Dawson entitled, "Cashew Nut Shell Liquid; IX; The Chromatographic Separation and Structural Investigation of the Olefinic Components of Methylcardanol" (Journal of the American Chemical Society, vol. 75, pages 4952–4957 of 1953); an article by Symes and Dawson entitled "Separation and Structural Determination of the Olefins of Poison Ivy Urushiol, Cardanol and Cardol" (Nature, vol. 171, pages 841–843 of 1953); article by Dawson entitled "The Chemistry of Poison Ivy" (Transactions of the New York Academy of Sciences, Ser. II, vol. 18, No. 5, pages 427–443, March 1956); an article by Sunthanker and Dawson entitled, "The Structural Identification of the Olefinic Components of Japanese Lac Urushiol" (Journal of the American Chemical Society, vol. 76, pages 5070–5074 of 1954); an article by Backer and Haack entitled "Components of Latex of Anacardium Occidentale Linnaeus" (Recueil des Travaux Chimiques des Pays-Bas, 60, pages 661–77, 1941), all made part hereof.

The standard method which may be employed for the production of some of the various specific starting materials of Formula I which may be used for the production of various specific novel compounds of this invention, within the scope of Formula II is as follows:

One molecular equivalent (approximately 340 grams) of anacardic acid is dissolved in 500 cc. of ethyl alcohol in which was previously dissolved 2.2 molecular equivalents (approximately 88 grams) of sodium hydroxide. To said solution there is added one molecular equivalent (approximately 125 grams) of dimethyl sulphate. The resulting mass is heated to boiling under a reflux condenser and maintained at such condition for a period of approximately six hours. Then the mass is allowed to cool to room temperature whereupon it will be found that a mass of crystalline material which consists essentially of sodium methyl sulphate has deposited. The supernatant liquid mass is decanted from the crystalline material and then the alcohol solvent is removed by distillation in vacuo, by maintaining said liquid at about 70° C. under pressure of 10–15 mm. of mercury. The resulting product is the sodium salt of the methyl ether of anacardic acid. Of course it is obvious to those skilled in the art that other reactants may be employed to vary the hydrocarbon radical on the ether group and/or the metallic element on the carboxyl group.

The most common commercially available products which may be employed as starting materials of this invention are cardanol, cashew nut shell liquid either in its natural state or decarboxylated and the alkyl ethers thereof.

In order to illustrate a method for practicing the present invention and to provide illustrative examples of the novel compounds of this invention, the following examples are given by way of illustration and not limitation, all parts being given by weight unless otherwise specified.

GENERAL EXAMPLES OF METHODS

According to this invention, compounds of Formula II as well as mixtures thereof, may be prepared by mixing together compounds of Formula I or mixtures thereof together with an alkali, such as sodium hydroxide or potassium hydroxide, potassium amide and a solvent, such as liquid ammonia, ethylene glycol monomethyl ether preferably under an inert ambient, such as nitrogen or the like, and maintaining said mixture at temperatures between about −30° C. to 225° C., depending upon the particular solvent employed, whereupon the nonconjugated double bonds in $R_2$ of said starting materials become conjugated. When the ethylene glycol monomethyl ether is used, a temperature range of about 100° to 225° C. is preferably employed.

Still another method which may be employed for the production of compounds of Formula II, as well as mixtures thereof, is to maintain at about 25°–300° C. compounds of Formula I as well as mixtures thereof in the presence of nickel on carbon with traces of sulphur, selenium and/or tellurium whereupon the unconjugated double bonds in $R_2$ of said starting materials become conjugated.

Examples of some of the specific illustrative starting materials which may be employed in the practice of this invention to produce illustrative examples of some of the novel materials of this invention, namely, compounds of Formula II and mixtures thereof are the following Starting Materials A–G of the following structural formulas respectively:

STARTING MATERIAL A

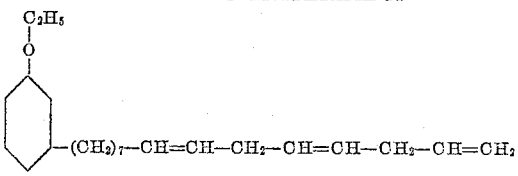

STARTING MATERIAL B

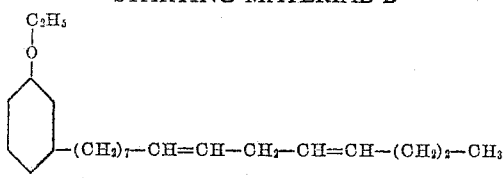

STARTING MATERIAL C

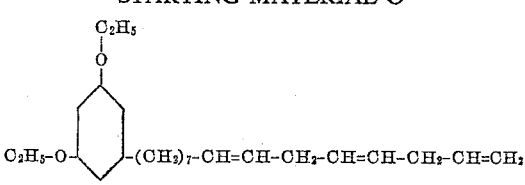

STARTING MATERIAL D

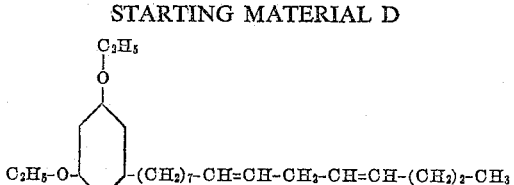

STARTING MATERIAL E

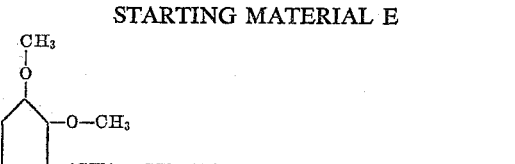

STARTING MATERIAL F

This starting material may be produced by following the procedure hereinbefore set forth and contains at least forty percent by weight of a mixture of two of the following compounds:

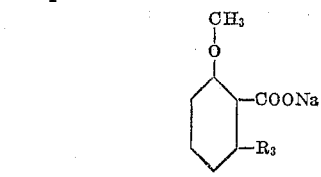

wherein $R_3$ is the same as the unsaturated hydrocarbon substitutent of Starting Material A or is the same as the unsaturated hydrocarbon substituent of Starting Material B.

STARTING MATERIAL G

Commercial ethyl ether of vacuum distillate of cashew nut shell liquid also known as ethyl ether of unrefined cardanol. Such material consisted substantially completely of a mixture of the following components in the below set forth proportions by weight:

|  | Percent |
|---|---|
| Starting Material A | 38 |
| Starting Material B | 18 |
| Starting Materials C and D and yellow substances | 10 |
| $C_2H_5$—O—$C_6H_4$—$C_{15}H_{29}$ (monoolefin) | 33 |
| $C_2H_5$—O—$C_6H_4$—$C_{15}H_{31}$ (saturated) | 4 |

Example 1

Ten and one-half parts of sodium hydroxide (97.1% NaOH) were placed in a round-bottomed flask which was provided with a thermometer, a stirrer and a Claisen head-Vigreux combination. After replacing the air in the apparatus with oxygen-free nitrogen, 40 parts of purified and distilled ethylene glycol monomethylether were added through the top of the Vigreux column. The flask was then heated in an oil bath until its inside temperature had reached 147° C., whereupon 3.77 parts of Starting Material A dissolved in 10 parts of ethylene glycol monomethylether solvent were added, followed by another 10 grams of said solvent. The mixture was kept at 143–145° C. (bath temperature 155–160° C.) for one hour, during which time 2.5 parts of water and said solvent (B.P. 100–105° C.) distilled over. The reaction mass was then cooled to room temperature and quantitatively transferred with 500 parts of distilled pentane and 3,000 parts of ice-cold water to a separatory funnel. The aqueous phase was acidified to pH of 4 with 23.5 parts of concentrated hydrochloric acid and the pentane layer separated. After another extraction with 400 parts of pentane, the combined pentane extracts were washed with ice-cold water three times (3000, 3000 and 2000 parts), shaken with pieces of filter paper to remove water droplets, filtered into a volumetric flask and diluted to 1000 cc. with distilled pentane. This stock solution was kept continuously under prepurified nitrogen and at minus 30° C.

220 parts of said stock solution was distilled to drive off the bulk of the pentane and the residue was subjected to a pressure of 1 mm. of mercury pressure and a temperature not greater than 35° C. for about one-half hour to remove the last traces of solvent. The resultant product, namely Product 2, measuring about .8 part (98% recovery), was faintly yellow, had a refractive index at 25° C. using the sodium D line of 1.5377. Product 2 comprises chiefly isomerized Material A, with over 50% of said isomerized Material A having conjugated all of the double bonds in the side chain thereof.

The remaining 780 parts of said stock solution were freed of solvent as before yielding 2.9 parts (98% recovery) of Product 2. All of said 2.9 parts of Product 2 was dissolved in 24 cc. of acetone. This solution was cooled to −75° C. and filtered and both the filtrate and precipitate were recovered. The filtrate was concentrated so that instead of containing 24 cc. of acetone it now contains 11 cc. of acetone and this resultant concentrated solution was cooled to −75° C. and was filtered and no precipitate appeared on the filter paper, but all of the filtrate was recovered and the acetone solvent was permitted to evaporate off leaving behind 1.45 grams of a mass, hereinafter known as Product IId, liquid at room temperature and having a refractive index at 25° C. of 1.5347. The precipitate obtained on the first filtration measured 1.45 grams, was almost white and was now dissolved in 29 cc. of acetone. The temperature of this solution was reduced to −40° C., and this solution was filtered, whereupon there were obtained .57 gram of a white precipitate and a filtrate. Said .57 gram of white precipitate was dissolved in 13.5 cc. of acetone and the temperature of this solution was reduced to −30° C., and then filtered whereupon there were obtained a filtrate and .38 gram of white crystalline material, hereinafter known as Product IIb, having a melting point of 30–31° C. and refractive index of 25° C. of 1.5442. Product IIb is so reactive that it should be maintained at a temperature no greater than 0° C. and also under an atmosphere of nitrogen to prevent oxidation and homopolymerization over extended periods of time. The last two filtrates were freed of solvent leaving behind .88 gram and .19 gram, respectively, of liquids which were combined to obtain approximately 1 gram of liquid material which was dissolved in 11.5 cc. of acetone and the temperature of this solution was reduced to −70° C. and filtered whereupon there was obtained .67 gram of a mass, hereinafter known as Product IIc, liquid at room temperature, having a melting point of 10–15° C. and refractive index at 25° C. of 1.5406. These fractions, Products IIb, IIc and IId, were subjected to various tests in order to determine the degree of conjugation and the position of the double bonds. In order to determine the degree of conjugation of the side chains of said fractions, we obtained ultra violet absorption spectra of respective solutions thereof in distilled ethanol. It is known that a system of two conjugated double bonds in a hydrocarbon straight chain shows a strong absorption band at approximately 230 mu and that a system of three conjugated double bonds in a hydrocarbon straight chain shows a strong absorption band in the range of 265–270 mu.

Product IIb upon such test showed a strong absorption band at 267 mu and negligible absorption in the range of 225–230 mu. This established that Product IIb was substantially completely triene conjugated in the side chain thereof.

Product IId upon such test showed a strong absorption band at 225 mu, with only slight absorption at 267 mu, thus establishing that product IId was substantially completely diene conjugated in the side chain thereof.

Product IIc upon such test showed absorption bands at both 225 mu and 267 mu, thus establishing that Product IIc was a mixture of diene and triene conjugations in the side chains thereof.

Starting Materials A and G as well as ethyl ether of 3-pentadecyl phenol were respectively subjected to such test and showed negligible absorption bands at both 225 mu and 267 mu, thus establishing the absence of diene or triene conjugation in the side chains thereof.

The positions of the double bonds in the side chains of the various isomers may be determined employing the classical procedure of ozonization followed by catalytic reduction of the ozonides and analysis of the resulting products.

The positions of the double bonds of Product IIb were so determined and it was found that Product IIb consisted essentially of the following compounds:

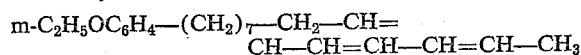

and

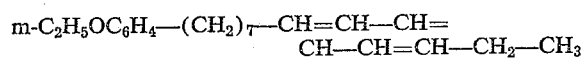

The positions of the double bonds of Product IId were also so determined and it was found that Product IId consisted essentially of the following compounds:

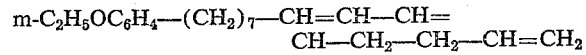

and

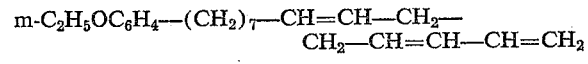

Product IIc consisted essentially of a combination of the last four identified compounds.

Example 2

Three and one-half parts of sodium hydroxide (97.1% NaOH) were placed in a round-bottomed flask which was provided with a thermometer, a gas inlet, a stirrer, a Claisen head and a short Vigreux column having a side-arm for the passage of nitrogen and distillate. The air in the apparatus was replaced with oxygen-free nitrogen and a small flow of such nitrogen was maintained, while 10 parts of pure dry ethylene glycol monomethylether solvent was added thereto through the top of the Vigreux column. The flask was then heated in an oil bath until all alkali had dissolved and the inside temperature had reached 147° C., whereupon 2.5 parts of Material G dissolved in 5 parts of ethylene glycol monomethylether were added followed by another 10 parts of said solvent. The resultant mixture was maintained at 145° C. plus or minus 1° C. for one hour during which a little water and some of said solvent (B.P. 100–105° C.) distilled over. The reaction mixture was then rapidly cooled to room temperature, while still blanketed with nitrogen and quantitatively transferred with 500 parts of distilled pentane and 2000 parts of ice-cold, distilled water to a separatory funnel. The aqueous phase was acidified to pH of 4 with about 8 parts of concentrated hydrochloric acid and the pentane layer separated. After another extraction with pentane the combined pentane extracts were washed twice with ice-cold water, shaken with pieces of filter paper to remove water droplets and filtered. After distilling off the bulk of the pentane from the filtrate, the last traces of solvent were evaporated in vacuo at a temperature not higher than 35° C., leaving behind a light yellow colored, isomerized Material G, having had their double bonds shifted. Approximately 100% of the di-olefinic components of Material G, namely, Materials B and D now have all the double bonds in their side chains in conjugated relationship to provide novel isomers thereof, with each side chain of the isomers represented by either of the following:

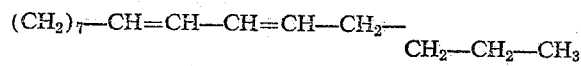

or

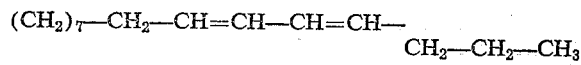

for the reason that isomerized Material B as well as isomerized Material D is a mixture of such differently and completely conjugated diolefinic compounds. Approximately 70% of the triolefinic components of Material G, namely, Materials A and C now have all the double bonds in their side chains in conjugated relationship to provide novel isomers thereof, with each side chain of the isomers being either of the following:

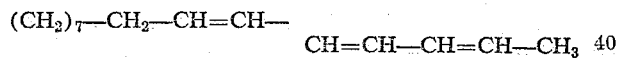

or

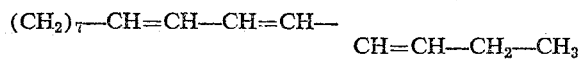

for the reason that the thus isomerized Material A as well as the thus isomerized Material C is a mixture of such differently and completely conjugated triolefinic compounds. The other 30% of the triolefinic components of Material G, namely, Materials A and C, now have only two of the double bonds in their side chains in conjugated relationship to provide novel isomers thereof, with each side chain of the isomers being either of the following:

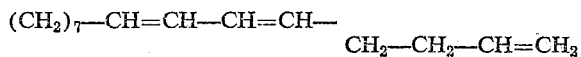

or

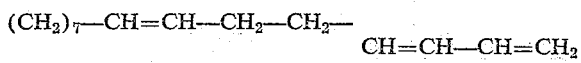

for the reason that the thus isomerized Material A as well as the thus isomerized Material C is a mixture of such diene conjugated triolefinic compounds, which are characterized by being diene conjugated and having a terminal double bond.

Thus Material IIa consists essentially of a mixture of various compounds, namely, ethyl ether of 3-n-pentadecyl phenol, ethyl ether of 3 pentadecenyl phenol (ethyl ether of cardanol monoolefin) and isomerized Starting Materials A, B, C and D.

Follow the same procedure and proportion of components as that set forth in Example 2 except that 2.5 parts of any of the other compounds or mixtures of compounds of Formula I may be substituted for the 2.5 parts of Material G and thus there may be produced a great variety of other compounds of Formula II.

All of the compounds of the present invention, examples of which are those hereinbefore specifically set forth, may be used for internal curing electrical varnishes. For example, any of said compounds, with or without first being homopolymerized, to a molecular weight of about 2,000, may be dissolved in an equal weight of VM & P naphtha. Into such solution may be dipped an electrical coil, such as motor armature, transformer coil, etc. which is then removed therefrom. The so coated and impregnated element is placed in an oven at 250°–300° F. and allowed to remain therein for 24 hours whereupon the solvent is driven off and the compound carried thereby is converted into a solid and substantially infusible, moisture resistant mass.

Since certain changes in carrying out the above process and certain modifications in the compositions embodying the invention may be made without departing from its scope, it is intended that all matter contained in the above description shall be interpreted as illustrative and not in a limiting sense. It is also to be understood that other materials may be added to our novel compositions of matter herein claimed without departing from the spirit of the invention. Particularly, it is to be understood that in said claim, ingredients or components recited in the singular are intended to include compatible mixtures of said ingredients wherever the sense permits.

This application is a continuation-in-part of our copending application Ser. No. 778,303, filed December 5, 1958, and now abandoned.

We claim:

A compound of the formula:

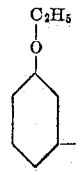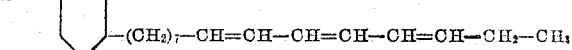

References Cited in the file of this patent

UNITED STATES PATENTS

| | | |
|---|---|---|
| 2,181,119 | Caplan | Nov. 28, 1939 |
| 2,240,034 | Caplan | Apr. 29, 1941 |
| 2,380,319 | Kremers | July 10, 1945 |
| 2,384,323 | McClearny | Sept. 4, 1945 |
| 2,431,127 | Kremers | Nov. 18, 1947 |

OTHER REFERENCES

Sunthanker et al.: Jour. Amer. Chem. Soc., volume 76 (1954), pages 5070–5074.

Symes et al.: Jour. Amer. Chem. Soc., volume 76 (1954), pages 2959–2963.

Loev et al.: Jour. Amer. Chem. Soc., volume 78 (1956), pages 6095–6098.

Royals: Advanced Organic Chemistry (1956), page 314. (Copies in Lib.)